Sept. 20, 1955     O. L. POWERS     2,718,448
RECORDER
Filed May 22, 1952     2 Sheets-Sheet 1
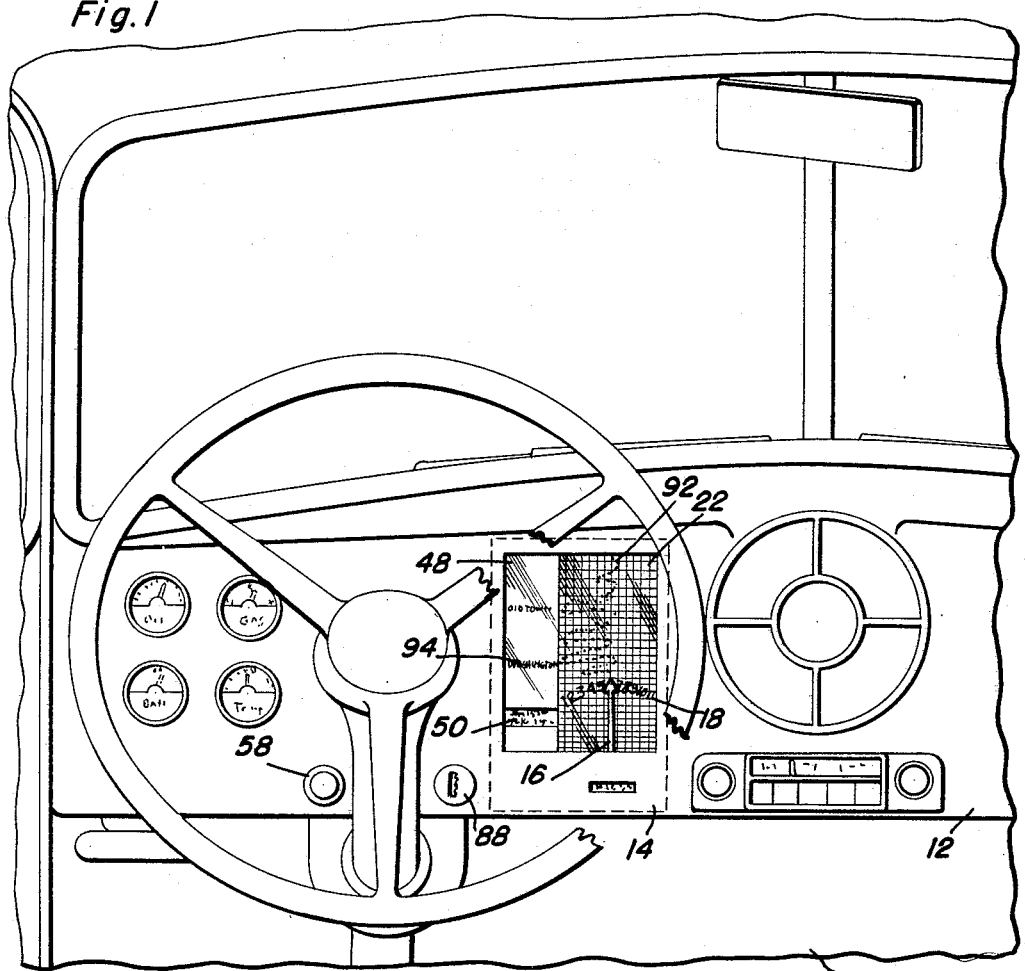
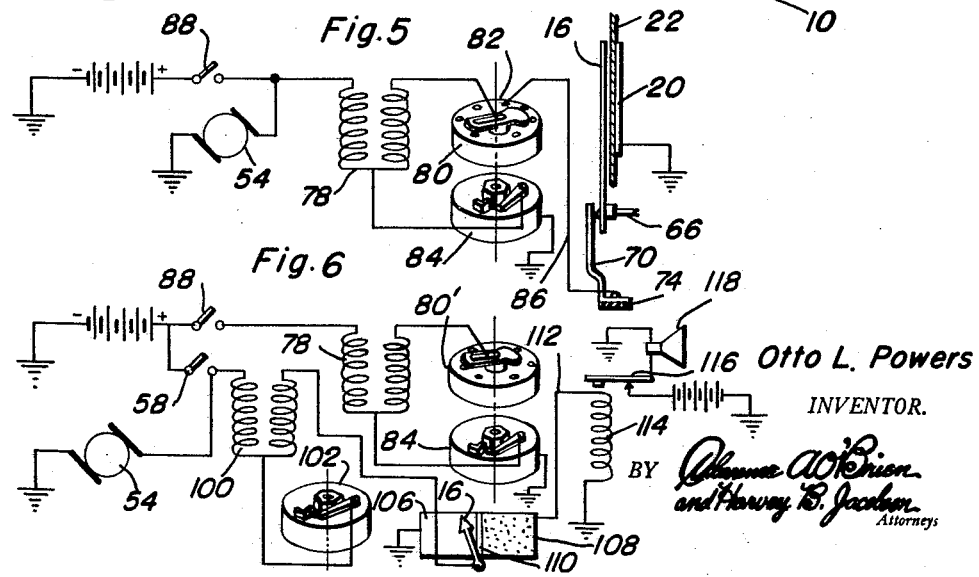
Otto L. Powers
INVENTOR.

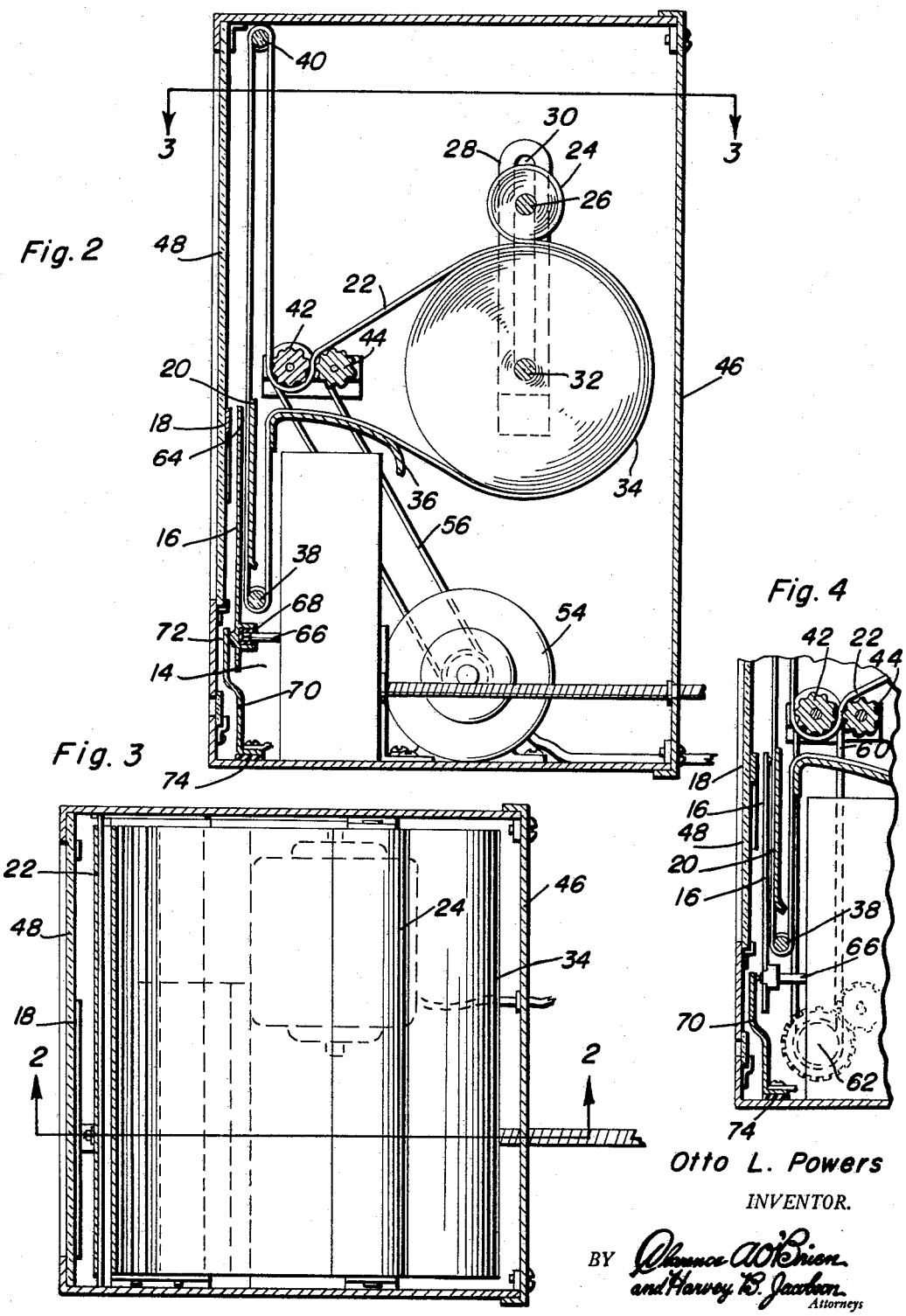

United States Patent Office 2,718,448
Patented Sept. 20, 1955

2,718,448
RECORDER

Otto L. Powers, El Reno, Okla.

Application May 22, 1952, Serial No. 289,364

1 Claim. (Cl. 346—18)

This application relates to a recorder and particularly to a recording device to be attached to an indicating instrument.

It is frequently desirable to have a permanent record of the instantaneous indications of an indicating instrument. For example, the record of a speedometer needle over a day would give an indication of mileage, the speeds at various times, the times the vehicle was standing still and other indications which might be of use to the owner of a vehicle or particularly to a fleet operator.

The present invention provides a record device to be attached to an indicating instrument and having means for producing a permanent record on a record tape so that the record may be considered at any time after being made.

The record device according to the present invention comprises a surface or dial of conducting material and a pointer or indicating member having a point of conducting material and means for impressing periodic or intermittent current impulses between the point and the conducting surface to produce holes or other indicia in the record tape.

It is accordingly an object of the invention to provide a record device.

It is a further object of the invention to provide a record device for attachment to an indicating meter.

It is a further object of the invention to provide an electrical marking device for any indicator.

It is a further object of the invention to provide an improved driving means for supplying a record tape to a record machine.

Other objects and many of the attendant advantages of the present invention will be apparent from the following detailed description taken in conjunction with the accompanying drawing in which:

Figure 1 is a front elevation of the recorder applied to the speedometer of a vehicle;

Figure 2 is a vertical section of parts in elevation through the recorder taken substantially on the plane indicated by the line 2—2 of Figure 3;

Figure 3 is a cross section taken substantially on the plane indicated by the line 3—3 of Figure 2;

Figure 4 is a fragmentary sectional elevation showing a modified drive for the recorder;

Figure 5 is a diagrammatic illustration of the electrical system for the recorder combined with the ignition system of a vehicle; and Figure 6 is a diagrammatic illustration of an independent electrical system for the recorder.

In the exemplary embodiment of the invention a motor vehicle 10 has an instrument dash 12 on which is mounted the usual odometer 14 having an indicator member 16 cooperating with a dial or indicia 18. The indicating member 16 moves in front of a conducting surface 20 which is preferably arranged as a flat smooth surface adjacent which the pointer 16 moves. A record tape 22 is contained in a roll 24 mounted on an axle 26 the ends of which are rotatably and slidably mounted in bracket members 28, the bracket members 28 being provided with a longitudinal slot 30 for accommodating the ends of the axles 26. The opposite end of the record tape 22 is wound on an axle 32 which is also rotatably and slidably mounted in the slot 30, so that the roll 24 rests on the top of the surface of the roll 34 so that the two rolls must rotate with their surfaces in synchronizm.

The tape 22 feeding off of the roll 24 extends over the surface of the roll 34 and over the sliding guide 36 and is entrained over a guide roller 38 mounted adjacent to and preferably below the surface 20. The record tape 22 then extends between the surface 20 and the pointer 16 and is entrained over a second guide roll 40. The tape 22 is then entrained between a pair of meshing feed rollers 42 and 44 which may be rotated by any suitable drive to traverse the record strip 22 over the surface 20.

The odometer 14 will be driven by the usual speedometer cable or flexible shaft so that the pointer 16 will be moved over the surface 20 in proportion to the speed of the vehicle. The indicia 18 will usually be calibrated in miles per hour, but obviously any other calibration desired may be used. The odometer is preferably mounted in substantially tight casing 46 having a glass panel 48 so that the odometer and the indicator hand may be observed through the panel and likewise the record about to be described can also be partially observed therethrough.

The glass panel 48 is preferably provided with a window or other aperture 50 through which access may be had to a portion of the tape for making notes or other indicia on the record strip.

If it is desired to drive the record tape 22 at a constant speed it is generally preferable to provide a drive motor 54 which may be connected to the feed rolls 42 and 44 by any suitable driving connection such as the belt 56. A motor 54 may be controlled by a suitable lock device such as a key switch 58. The record device, of course, is usable in many ways but for the purpose of the present invention it will be indicated as applied to the speedometer for learning the movements of a vehicle throughout the day or any other stated period. At the beginning of the interval the fleet owner or operator will close the switch 58 so as to start the motor 54 and the tape 22 will be driven at a constant rate of speed over the surface 20 until the paper strip is either exhausted or until the switch 58 is open. When it is only desired to have the tape 22 driven in response to movement of the vehicle a driving connection such as the belt 60 may be connected to some movable part of the odometer such as the drive shaft 62.

Periodic indicia is placed on the tape 22 by means of an electric discharge device comprising the conducting plate 20 and a conducting point 64 on the conducting member 16 which is mounted in insulated relation to a suitable drive shaft 66 by means of an insulated bushing 68. A suitable impulse generator is connected between the member 16 and the plate 20 by suitable circuit means including a conductor member 70 having a contact point 72 in close proximity to the member 16 preferably at a point substantially coaxial with the drive shaft 66. The brush 70 is mounted in insulated relation to the case 46 by means of a suitable insulator 74. In the modification as indicated in Figure 5, the impulsing device is the usual so-called spark coil of the ignition system and is connected to the distributor 80 by means of an auxiliary terminal 82 and the breaker 84 is likewise provided with an auxiliary point so that an impulse is provided through the auxiliary point 82 through a conductor 86 through the conductor 70 through the member 16 to the point 64 and then through the indicator tape 22 to the grounded member 20. The motor 54 is shown as controlled by the usual ignition switch 88. Obviously, an independent switch 58 could be utilized so that the motor 54 could be operated totally independent of the ignition switch 88.

However, it will be apparent that during the interval when the ignition switch 88 is open there would be no indicia made on the record tape 22.

In the operation of this form of the device the auxiliary point 82 will produce periodic discharges between the point 64 and the surface 20 which will cause marks such as burned marks or perforations on the tape 22 to produce an indicating trace 92. It will be obvious that examining the trace 92 on the record 22 it will be possible to indicate at what speed the vehicle was traveling and for what intervals it was standing still and not traveling and if desired the operator could have made notations 94 through the window 50 so that an explanation of the various conditions on the chart by the trace 92 could be explained.

In the hook-up as shown in Figure 6 the ignition system comprises usual ignition coils 78, breaker 84 and distributor 80' while a separate impulser comprises an induction coil 100 controlled by an individual breaker 102 which will be driven by any available power source such as the motor 54. The high tension side of the coil will be connected to the member 70. It will be obvious that in this form of the connection the perforations or other indicia 92 will be continuous regardless of the motion of the vehicle or the condition of the ignition system.

A conducting surface may be provided as a plurality of conducting surfaces 106 and 108 with an insulation 110 therebetween. Preferably the section 106 is grounded so that the discharge between the pointer 16 and the section 106 will be directly grounded. The section 108 on the other hand is insulated from ground by the insulation 110 and a work circuit 112 is connected between the section 108 and ground. The work circuit may include a relay coil 114 which would operate a switch 116 to connect in circuit a signalling device such as a horn 118. In the operation of this form of the device when the needle 16 reached a certain predetermined speed the work circuit 112 would operate the coil and the relay 116 to either give a signal, disconnect the ignition circuit or do any other work as may be desired.

It will be apparent that the present invention provides a simple recording device for attachment to any type of indicating instrument to indicate over any period of time the instantaneous operation of the indicating device. In particular, the present invention provides a record system for maintaining a supervisory control over vehicles or other devices which have a speedometer or other record indicating device thereon.

While for purpose of indication the device has been shown as attached to a speedometer, it will be apparent that the device may be attached to any instrument regardless of the use to which it is put.

For purpose of exemplification the particular embodiments have been shown and described according to the best present understanding thereof. However, it will be apparent to those skilled in the art that many changes and modifications can be made therein without departing from the true spirit of the invention.

Having described the invention, what is claimed as new is:

A recorder for attachment to an indicating instrument comprising a conducting surface, an indicating member movable adjacent to said surface, a record strip interposed between said member and said surface, a shaft rotatable in response to the motion of a vehicle, a driving connection between said shaft and said record strip, said driving connection traversing said strip over said surface, a discharge point on said member, an impulse generator, circuit means impressing the potential of said generator between said point and said surface, said conducting surface being divided into a plurality of sections, insulation between said sections, an impulse responsive work circuit connected in series with one of said sections.

References Cited in the file of this patent

UNITED STATES PATENTS

| | | |
|---|---|---|
| 1,101,840 | Foote | June 30, 1914 |
| 1,825,783 | Dunning | Oct. 6, 1931 |
| 1,899,956 | Greenley | Mar. 7, 1933 |
| 1,957,432 | Barnes | May 8, 1934 |
| 2,169,230 | Martile | Aug. 15, 1939 |
| 2,341,118 | Rodanet | Feb. 8, 1944 |
| 2,596,446 | Stamper | May 13, 1952 |

OTHER REFERENCES

"Instruments," May 1928, pp. 253–254.